United States Patent
Liu et al.

(10) Patent No.: US 10,007,166 B2
(45) Date of Patent: Jun. 26, 2018

(54) ELECTRONIC INKS

(71) Applicant: Hewlett-Packard Development Company, L.P., Houston, TX (US)

(72) Inventors: Qin Liu, Corvallis, OR (US); Yaron Grinwald, Meitar (IL); Gregg Combs, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 9 days.

(21) Appl. No.: 14/901,995

(22) PCT Filed: Aug. 30, 2013

(86) PCT No.: PCT/US2013/057571
§ 371 (c)(1),
(2) Date: Dec. 29, 2015

(87) PCT Pub. No.: WO2015/030798
PCT Pub. Date: Mar. 5, 2015

(65) Prior Publication Data
US 2016/0187756 A1    Jun. 30, 2016

(51) Int. Cl.
*G02B 26/00* (2006.01)
*G02B 26/08* (2006.01)
(Continued)

(52) U.S. Cl.
CPC ............ *G02F 1/167* (2013.01); *C09D 11/03* (2013.01); *C09D 11/52* (2013.01); *G02F 2001/1678* (2013.01)

(58) Field of Classification Search
USPC ........ 359/242, 247, 265–267, 270–273, 321, 359/322, 290–292, 295, 296, 298
See application file for complete search history.

(56) References Cited

U.S. PATENT DOCUMENTS 4,408,202 A    10/1983    Fales
7,283,119 B2   10/2007    Kishi
(Continued)

FOREIGN PATENT DOCUMENTS

CN    101424558    5/2009
JP    2003315847   11/2003
(Continued)

OTHER PUBLICATIONS

Heikenfeld, Jason, et al., "A critical review of the present and future prospects for electronic paper", Journal of the SID 19/2, 2011, pp. 129-156.
(Continued)

*Primary Examiner* — Brandi Thomas
(74) *Attorney, Agent, or Firm* — Dierker & Kavanaugh, P.C.

(57) ABSTRACT

Electronic inks are disclosed herein. An example of the electronic ink includes a non-polar carrier fluid, a colorant particle dispersion, and a charge director. The colorant particle dispersion includes another non-polar carrier fluid (which may be the same as, or different from the non-polar carrier fluid), colorant particles, and chargeable dispersant molecules bonded to the colorant particles. The charge director is to charge the chargeable dispersant molecules.

23 Claims, 7 Drawing Sheets

(51) Int. Cl.
  *G02F 1/29* (2006.01)
  *G02F 1/167* (2006.01)
  *C09D 11/03* (2014.01)
  *C09D 11/52* (2014.01)

(56) References Cited

U.S. PATENT DOCUMENTS

| | | |
|---|---|---|
| 7,411,720 B2 | 8/2008 | Honeyman et al. |
| 7,429,317 B2 | 9/2008 | Paul |
| 8,018,642 B2 | 9/2011 | Yeo et al. |
| 8,102,363 B2 | 1/2012 | Hirayama |
| 8,184,357 B2 | 5/2012 | Yeo et al. |
| 8,331,014 B2 | 12/2012 | Liu et al. |
| 8,358,322 B2 | 1/2013 | Yeo et al. |
| 8,441,714 B2 | 5/2013 | Paolini, Jr. et al. |
| 2001/0020062 A1 | 9/2001 | Abuelyaman et al. |
| 2011/0216392 A1 | 9/2011 | Baisch et al. |
| 2011/0297888 A1 | 12/2011 | Farrand et al. |
| 2011/0304905 A1 | 12/2011 | Yeo et al. |
| 2012/0001842 A1 | 1/2012 | Stellbrink |
| 2012/0092753 A1 | 4/2012 | Heikenfeld et al. |
| 2012/0118198 A1 | 5/2012 | Zhou et al. |
| 2012/0127560 A1 | 5/2012 | Mabeck et al. |
| 2012/0154896 A1 | 6/2012 | Clapp et al. |
| 2012/0190782 A1 | 7/2012 | Zhou et al. |
| 2012/0241695 A1 | 9/2012 | Zhou et al. |
| 2012/0267583 A1* | 10/2012 | Goetz, Jr. ............ C07D 471/06 252/586 |
| 2012/0268806 A1 | 10/2012 | Zhou et al. |
| 2012/0275012 A1* | 11/2012 | Zhou ...................... B82Y 30/00 359/296 |
| 2012/0300284 A1 | 11/2012 | Zhou et al. |
| 2012/0307347 A1 | 12/2012 | Clapp et al. |
| 2013/0016420 A1 | 1/2013 | Yeo et al. |
| 2013/0021393 A1 | 1/2013 | Combs et al. |
| 2013/0071690 A1* | 3/2013 | Liu ...................... C09D 11/037 428/704 |
| 2013/0087815 A1 | 4/2013 | Liao et al. |

FOREIGN PATENT DOCUMENTS

| | | |
|---|---|---|
| JP | 2004054029 | 2/2004 |
| KR | 20090098737 | 9/2009 |
| WO | WO2005/071479 | 8/2005 |
| WO | WO 2009/100803 | 8/2009 |
| WO | WO 2010/089057 | 8/2010 |
| WO | WO 2010/089058 | 8/2010 |
| WO | WO 2010/089059 | 8/2010 |
| WO | WO 2010/089060 | 8/2010 |
| WO | WO 2011/154104 | 12/2011 |
| WO | WO 2012/102802 | 8/2012 |

OTHER PUBLICATIONS

International Search Report and Written Opinion for International Application No. PCT/US2013/057571 dated May 19, 2014, 12 pages.

Koch, Tim, et al., "Novel Flexible Reflective Color Media With Electronic Inks", Journal of Information Display, vol. 12, No. 1, Mar. 2011, pp. 5-10.

Mourey, Devin A, et al "Amorphous Oxide Transistor Electrokinetic Reflective Display on Flexible Glass" Soc. Info Display Proceedings of the Int'l Workshop on Displays 2011, 5pgs.

* cited by examiner

ELECTRONIC INKS

BACKGROUND

Inks including charged particles (i.e., electronic inks) are widely used, for example, as additives for plastics, in liquid electrophotographic printing or piezoelectric inkjet printing, in electrophoretic and/or electrokinetic displays, and in a variety of other applications. Many electronic inks include negatively charged particles or positively charged particles. When used in displays, the charged colorant particles rearrange within a viewing area of the display to produce desired images in response to an applied electric field.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1A:
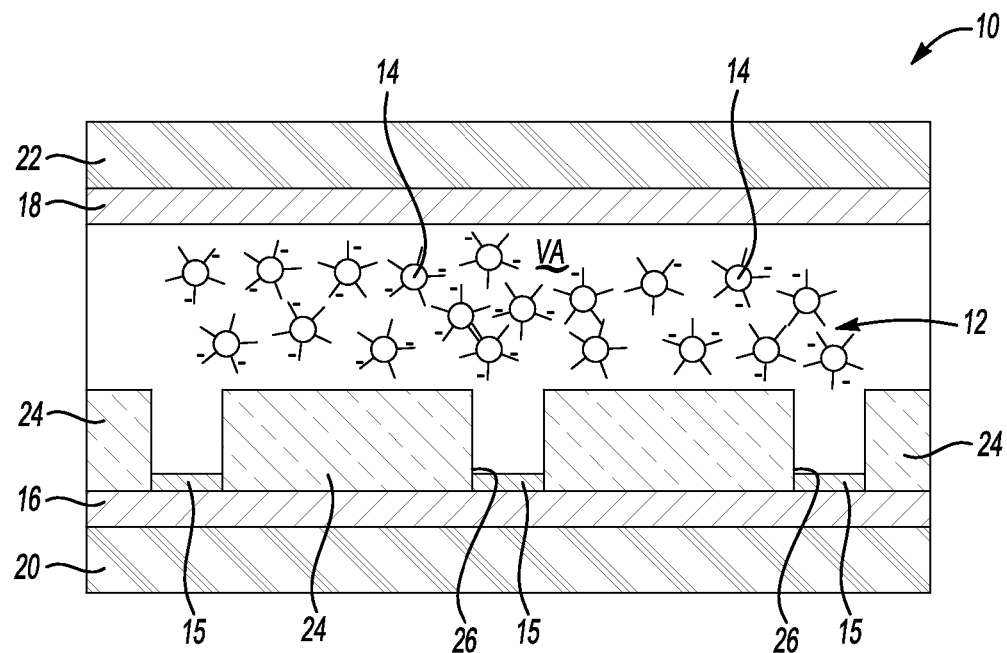
FIG. 1A is a cross-sectional, semi-schematic view of an example of a display element including an example of an electronic ink in a spread optical state.

The electronic inks disclosed herein are stable inks that are both highly dispersed and charged. The stability of the inks is believed to be due to the inclusion of chargeable dispersant molecules. These chargeable dispersant molecules are capable of interacting with and acting as dispersants for colorant particles. One or more of the chargeable dispersant molecules is capable of bonding to a partial colorant particle, a single colorant particle, or an aggregate of colorant particles. In an example, the chargeable dispersant molecules include a central chromophore, with chargeable pendant group(s) and steric stabilization group(s) covalently bonded thereto. It is believed that some of the chargeable pendant group(s) and steric stabilization group(s) may be bonded to the colorant particle(s), while others of the chargeable pendant group(s) and steric stabilization group(s) may be dangling. Bonding of the dispersant molecules to the colorant particles is believed to involve London forces and dipole moment (polar) attraction.

The dispersant molecule(s) are bonded directly to the surface(s) of the colorant particle(s). This significantly reduces or eliminates the amount of free (i.e., unattached) dispersant molecules in the ink. A reduction in the amount or the elimination of free dispersant molecules may reduce the amount of background charge due to the unattached dispersant molecules, and thus may also reduce field screening effects in electronic displays including the ink. A reduction in the amount or the elimination of free dispersant molecules may also reduce degradation (e.g., of dispersant, electrodes, etc.) observed in electronic displays as a result of operation, and thus may increase reliability and life of the displays including the ink.

The electronic inks disclosed herein may also be used in printing applications. The inks may be printed, for example, via liquid electrophotographic (LEP) printing systems.

Examples of the electronic ink disclosed herein include a non-polar carrier fluid, a colorant particle dispersion (including the colorant particles and the chargeable dispersant molecules), and a charge director. Other additives may be added, including those that enhance multi-stability (i.e., the ability to maintain a state without power) of a display including the electronic ink.

In the examples disclosed herein, it is to be understood that the chargeable dispersant molecules interact with the charge director, and the chargeable pendant groups become charged. This forms charged dispersant molecules. The charged dispersant molecules are bonded to the colorant particles, and thus charged colorant particles are present within the electronic ink.

In an example, the non-polar carrier fluid (in the ink and/or in the colorant dispersion) selected has a resistivity in excess of about $10^9$ ohm-cm and a dielectric constant k below 5. These fluids tend to reduce leakages of electric current when driving a display including the ultimately formed electronic ink, as well as increase the electric field present in the fluid when a voltage is applied thereto. In an example, the non-polar carrier fluid is an isotropic solvent. Examples of suitable non-polar carrier fluids include hydrocarbons, oxygenated fluids, siloxanes, silicone oils, organic solvents (e.g., naphthalenes, etc.), and/or natural oils (e.g., cotton seed oil, olive oil, soya (i.e., soybean oil), etc.). When hydrocarbons are utilized, the hydrocarbon may be an aliphatic hydrocarbon, an isomerized aliphatic hydrocarbon, a branched chain aliphatic hydrocarbon, an aromatic hydrocarbon, a halogenated hydrocarbon, or a partially halogenated hydrocarbon, or combinations thereof. In some examples, the carrier fluid includes isoparaffinic compounds, paraffinic compounds, dearomatized hydrocarbon compounds, and the like.

Specific examples of suitable carriers for the electronic ink include ISOPAR®-G, ISOPAR®-15 H, ISOPAR®-L, ISOPAR®-M, ISOPAR®-K, ISOPAR®-V, NORPAR® 12, NORPAR® 13, NORPAR® 15, EXXSOL® D40, EXXSOL® D80, EXXSOL® D100, EXXSOL® D130, and EXXSOL® D140 (available from Exxon Mobil Corp.); Teclen N-16™, Teclen N-20™, Teclen N-22™, Nisseki Naphthesol L™, Nisseki Naphthesol M™, Nisseki Naphthesol H™, Solvent L™, Solvent M™, Solvent H™, Nisseki Isosol 300™, Nisseki Isosol 400™, AF-4™, AF-5™, AF-6™ and AF-7™ (available from Nippon Oil Corp.); IP Solvent 1620™ and IP Solvent 2028™ (available from Idemitsu Kosan); Electron™, Positron™, New II™ and Purogen HF (available from Ecolink); perchloroethylene; halocarbons (such as halocarbon 0.8, halocarbon 1.8, halocarbon 4.2, and halocarbon 6.3); cyclohexane; dodecane; mineral oil; siloxanes (e.g., cyclopentasiloxane and cyclohexasiloxane); and combinations thereof.

In the examples disclosed herein, the electronic ink includes a balance of the non-polar carrier fluid, so that the total weight percent of the ink is 100. As such, the amount of non-polar carrier fluid included depends, at least in part, on the amount of the colorant particle dispersion and the amount of charge director included in the electronic ink.

The colorant particle dispersion(s) includes the same or a similar non-polar carrier fluid that is used in the ink and also includes the previously mentioned dispersant molecules. The dispersant molecules are made up of a central chromophore, with pendant groups covalently bonded to the central chromophore. At least some of the pendant groups provide steric stabilization to prevent agglomeration of the colorant particles (with which the dispersant molecules interact and bond). At least some other of the pendant groups provide a charging site that is capable of being charged by the charge director that is added to the ink.

Examples of the central chromophore, which may be considered an anchoring group of each dispersant molecule, include organic pigments or inorganic pigments.

An example of an organic black pigment includes aniline black, such as C.I. Pigment Black 1.

Some examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, and C.I. Pigment Yellow 180.

Examples of suitable magenta or red organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of cyan organic pigments include copper phthalocyanine, phthalimidomethyl copper phthalocyanine, C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Suitable examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Suitable examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

Suitable examples of white pigments include titanium dioxide, silica, and $TiO_2$—$SiO_2$ core-shell white particles.

As previously mentioned, the pendant groups are covalently attached to the central chromophore. The chargeable pendant groups may be any functional group that is capable of carrying a positive charge or a negative charge.

In some examples, the chargeable pendant groups on the central chromophore may include those functional groups that are capable of undergoing a reaction that introduces the negative charge on the functional group. These functional groups may be in acid form or in salt form. Examples of suitable groups that can carry a negative charge include a carboxyl group (COOH), dithoic acid (CSSH), a thiocarboxyl group (COSH), sulfonic acid ($SO_3H$) or derivatives thereof, phosphonic acid ($PO_3H$), sulfuric acid ($OSO_3H$), phosphoric acid ($OPO_3H$), and combinations thereof. It is believed that hydroxyl groups (OH) and thiol groups (SH) may be utilized as acid functional groups that can carry a negative charge, although these may be considered relatively weak acids. In an example, the chargeable pendant group is $(SO_3H)_x$.

In some instances, the negatively chargeable pendant group(s) is/are uncharged, but is/are capable of being charged, for example, by the charge director. In other instances where the central chromophore bearing any of the negatively chargeable pendant group(s) is present in a medium that is capable of solvating the acidic hydrogen, the pendant group(s) may be charged prior to the introduction of the charge director. In these instances, the charge director may be added to enhance the charge.

In other examples, the chargeable pendant groups on the central chromophore may include those functional groups that are capable of undergoing a reaction that introduces the positive charge on the functional group. These functional groups may be in base form or in salt form. Examples of suitable groups that can carry a positive charge include trialkyamines, pyridines, substituted pyridines, imidazoles, substituted imidazoles, and $R_1R_2N$— (where $R_1$ and $R_2$ are each independently selected from a hydrogen group, a methyl group, an ethyl group, a propyl group, an isopropyl group, a butyl group, an iso-butyl group, an n-octyl group, an n-decyl group, an n-dodecyl group, an n-tetradecyl group), and combinations thereof.

In some instances, the positively chargeable pendant group(s) is/are uncharged, but is/are capable of being charged, for example, by the charge director. In other instances where the central chromophore bearing any of the positively chargeable pendant group(s) is present in a medium that is capable protonating the base, the pendant group(s) may be charged prior to the introduction of the charge director. In these instances, the charge director may be added to enhance the charge.

In some instances and as mentioned above, at least some of the groups capable of carrying a positive charge may be basic salts, and/or that at least some of the groups capable of carrying a negative charge may be acidic salts. Salts of any of the previously listed functional groups in the base form and salts of any of the previously listed functional groups in the acid form may be used.

In addition to the previously mentioned charge enabling pendant groups, the dispersant molecules also include steric stabilizing pendant groups covalently bonded to the central chromophore. In an example, the steric stabilizing pendant group is

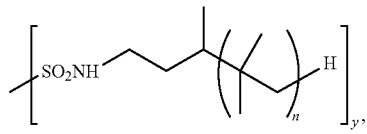

(Structure 1)

where y ranges from 0.58 to 2.8 and n ranges from 10 to 20. It is believed that Structure 1 may be modified, as long as a similar HLB ratio is obtained. In an example, the gem-dimethyl groups in the side-chains of Structure 1 may be replaced with hydrogen or other alkyl groups. In another example, the branched alkyl of Structure 1 may be replaced with a straight chain alkyl. In still another example, it is believed that the branched alkyl of Structure 1 may be replaced with a poly(ethylene oxide) (PEO) pendant chain or a poly(phenylene oxide) (PPO) pendant chain.

One example of the dispersant molecule has the following structure:

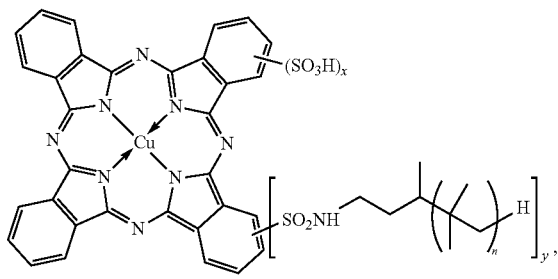

where y ranges from 0.58 to 2.8, x ranges from 0 to 1.8, and n ranges from 10 to 20. In an example, n is 16.5.

The dispersant molecule is readily dispersible in the selected non-polar carrier fluid of the colorant dispersion, and the final electronic ink.

The colorant particle dispersion also includes the colorant particles. Any of the previously listed pigments may be selected as the colorant particles. The colorant particles are charged as a result of the chargeable pendant group(s) of the dispersant molecules that are bonded to the colorant particles.

The colorant particle(s) may have an average particle size ranging from about 10 nm to about 10 µm. In some instances, the average colorant particle size ranges from about 10 nm to about 1 µm, or from about 50 nm to about 1 µm. In an example, the colorant particle size is equal to or less than 200 nm.

In an example, the ratio of dispersant molecules to colorant particles is 1:1. In another example, multiple dispersant molecules may bond to a single colorant particle, and thus the ratio of dispersant molecules to colorant particles is >1:1 (i.e., greater than 1). In still another example, each dispersant molecule may bond to an agglomeration of two or more colorant particles, and thus the ratio of dispersant molecules to colorant particles may be 1:>1 (i.e., less than 1).

Charge director(s) are components that induce and/or increase the charge on the respective dispersant molecules (and thus on the colorant particles which have the dispersant molecules bonded thereto). The charge directors can chemically or physically associate with the chargeable pendant group(s). In either instance, the charge director may facilitate and/or enhance charging of the dispersant molecules. In an example, the charge director is basic and reacts with the acidic pendant group to negatively charge the dispersant molecule. In other words, the charging of the dispersant molecule is accomplished via an acid-base reaction between the charge director and the acidic pendant group. This is one possible charging mechanism. A similar acid-base reaction may take place between an acidic charge director and a basic pendant group of the dispersant molecule. Another possible charging mechanism is the adsorption of charged micelles. With this charging mechanism, the selected charge director(s) may form a micelle (or a reverse micelle) structure physically associated, but not chemically associated, by hydrophobic bonding with the dispersant molecules to provide at least part of the charge. Hydrophobic bonding or, more appropriately, hydrophobic interaction represents a well-known phenomenon that occurs in micellular structures. Essentially, a reverse micelle forms in the non-polar carrier fluid when the hydrophilic heads of the amphiphilic molecules orient the molecules so as to assemble the hydrophilic heads together inside the micelle with hydrophobic tails assembled outside at the micelle surface. The charge director forms a reverse micelle structure that physically associates by hydrophobic bonding with the dispersant molecules to provide at least part of the charge. Hydrophobic bonding does not infer chemical bonding, but rather involves an attractive physical interaction.

Depending upon the charge director(s) that is/are selected, the reverse micelle that may be formed may be a positively charged micelle or a negatively charged micelle. Some charge directors are capable of forming positively charged micelles, negatively charged micelles, or both the positively charged micelles and the negatively charged micelles. As such, some charge directors are capable of associating with the base/base salt functional groups (introducing and/or enhancing the positive charge), some other charge directors are capable of associating with the acid/acid salt functional groups (introducing and/or enhancing the negative charge), and still some other charge directors are capable of associating with both the base/base salt functional groups or the acid/acid salt functional groups (introducing and/or enhancing both the positive and negative charges).

Examples of suitable charge directors include polyisobutylene succinimide; polyhydroxystearic amide salt; butanedioic acid, 2-sulfo-, 1,4-tridecyl ester, barium salt with barium hydrogen phosphate (2:1); and combinations thereof. In another example, the charge director is selected from a neutral and non-dissociable monomer or polymer such as, e.g., a polyisobutylene succinimide amine, which has a molecular structure as follows:

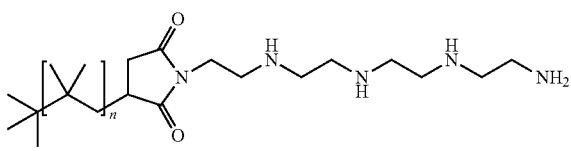

where n is selected from a whole number ranging from 15 to 100. Still another example of the charge director includes an ionizable molecule that is capable of disassociating to form charges, such as sodium di-2-ethylhexylsulfosuccinate and dioctyl sulfosuccinate. The molecular structure of dioctyl sulfosuccinate is as follows:

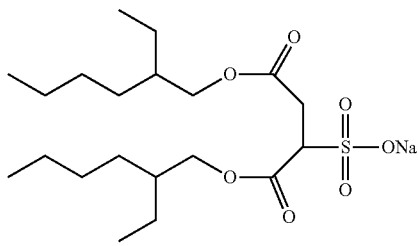

Yet another example of the charge director includes a zwitterion charge director such as, e.g., lecithin. The molecular structure of lecithin is as shown as follows:

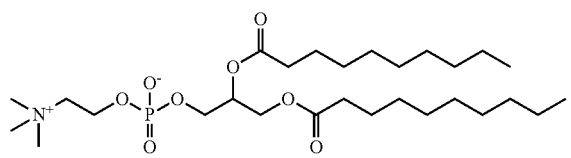 [SMILES: CCCCCCCCCC(=O)OCC(COP(=O)([O-])OCC[N+](C)(C)C)OC(=O)CCCCCCCCC]

Examples of the electronic ink disclosed herein include the colorant particle dispersion present in an amount ranging from about 5 wt. % to about 80 wt. % of the total wt. % of the electronic ink; the charge director present in an amount ranging from about 0.05 wt. % to about 5.0 wt. % of the total wt. % of the electronic ink; and a balance of the non-polar carrier fluid. In the inks disclosed herein, the colorant particle amount generally ranges from about 0.5 wt. % to about 10 wt. % of the total wt. % of the ink.

The electronic ink(s) disclosed herein may also include an additive that impacts the multi-stability of a display in which the electronic ink is used. A display is multi-stable if it is able to maintain a state without power being supplied. One additive that may affect multi-stability is an oligomeric additive having a number average molecular weight (Mn) ranging from about 183 to about 20,000. The oligomeric additive may be a high molecular weight hydrocarbon solvent (having a Mn greater than about 183), or a low to medium molecular weight polybutene or polyisobutene (having a Mn up to 10,000). Any amount of the oligomeric additive may be added that is up to 80 wt. % of the total wt. % of the electronic ink.

Two differently colored colorant particle dispersions may be selected for a single electronic ink. In an example, any desirable combination of colors may be utilized, as long as one of the colorant particle dispersions is functionalized with a base or its salt so that it is capable of carrying a positive charge and the other of the colorant particle dispersions is functionalized with an acid or its salt so that it is capable of carrying a negative charge. The charges are separated by the steric stabilizing pendant groups of the dispersant molecules, which prevent the agglomeration and crashing out of the two particle species due to the attraction of opposite charges. In another example, any desirable combination of colors may be utilized, and the colorant particle dispersions may be functionalized so that they are capable of carrying the same charge. Examples of the different colors that may be selected for a single electrically addressable ink include magenta and black, cyan and yellow, magenta and cyan, orange and blue, red and white, green and white, blue and white, yellow and white, or any other combinations of colors.

As mentioned above, the electronic inks 12 disclosed herein may be used in a display element 10, as shown in FIG. 1A (when no voltage is applied) and FIG. 1 B (when a voltage is applied). The display element 10 disclosed herein may be particularly suitable for use in electrokinetic displays, where combinations of multiple electrokinetic phenomena, such as electrophoresis, electro-convection, and electrochemical interactions, lead to the control of the charged colorant particles 14 in the electronic ink 12 through charge transfer between conductive electrodes 16, 18 of the display element 10 and the electronic ink 12. The charged colorant particles 14 include the colorant particle(s) having the dispersant molecule(s) bonded thereto, where the chargeable pendant groups of the dispersant molecule are carrying a positive or negative charge as a result of interaction with the charge director (not shown).

Figure 1B:
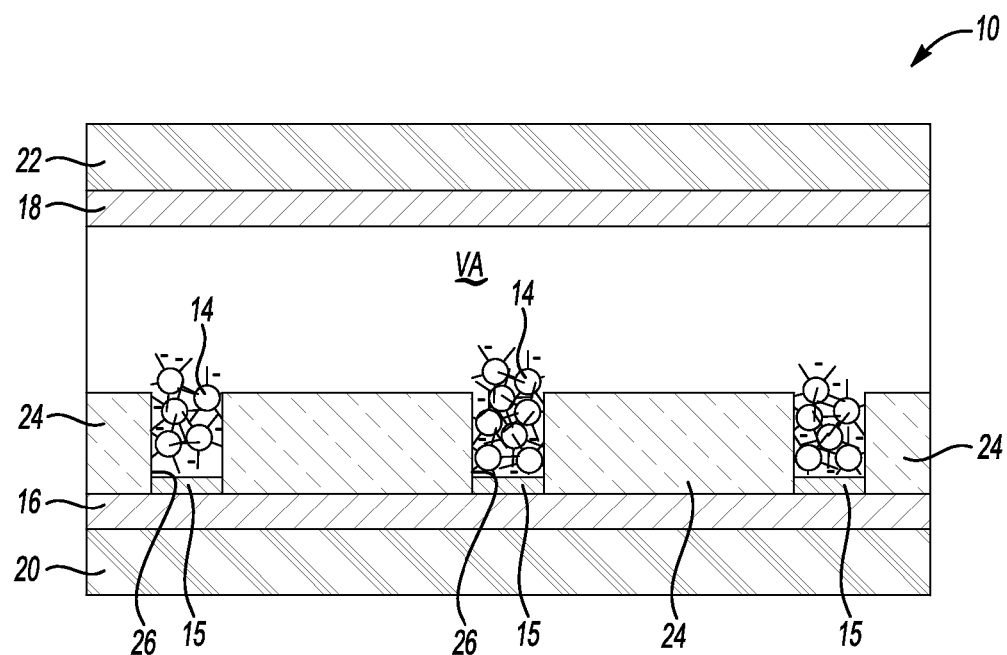
FIG. 1B illustrates the display element of FIG. 1A in a clear optical state.

While a single display element 10 is shown in FIGS. 1A and 1B, it is to be understood that a display may include several individual display elements 10 arranged on substrate in rows and in columns, or several display elements 10 that are provided as individual segments (i.e., each element 10 is isolated from each other element 10 and each element 10 is a directly addressable component). The displays may be driven via a number of different address schemes, including passive matrix addressing or active matrix addressing.

The display element 10 includes opposed electrodes 16, 18 having a viewing area VA defined therebetween. Examples of suitable materials for the electrodes 16, 18 include a metal (such as, e.g., gold, aluminum, nickel, copper, tantalum, etc.), a conductive oxide (such as, e.g., indium tin oxide (ITO), etc.), a conductive polymer (such as, e.g., PEDOT (poly(3,4-ethylenedioxythiophene), and/or the like), a conductive composite (such as, e.g., a layer of carbon nano-tubes, etc.), and/or combinations thereof. It may be desirable to select transparent materials for the electrodes 16, 18, or at least for electrode 18.

It is to be understood that depending upon how the display element 10 is to be addressed, the electrodes 16, 18 each may be pixel-size conductive plates (i.e., pixelated electrodes connected with driving circuitry by linear or non-linear electrical elements, wherein such plates contribute to a pixelated array of electrodes), essentially one-dimensional line electrodes (with the intersection of two crossing lines defining individual pixels), or entire segmented electrodes (i.e., essentially two dimensional conductive plates which are electrically isolated from each other and are addressed individually and independently of each other). An essentially one-dimensional line electrode has one dimension that is larger than another dimension (e.g., length is much greater than diameter). An essentially two-dimensional conductive plate has a cross-sectional area that is significant compared to the area of the display element 10.

The display element 10 may also include the substrate 20, which supports one of the electrodes 16, 18. In another example, as illustrated in both FIGS. 1A and 1B, the display element 10 includes two opposed substrates 20, 22 each of which supports a respective electrode 16, 18. The substrates 20, 22 may be selected from insulating materials, conducting materials, or semi-conducting materials. In an example, the substrates 20, 22 are independently selected from an insulating material, such as glass, various polymers, and/or the combinations thereof. Examples of suitable polymers include polycarbonates (PC), polyarylates (PAR), polyimides (PI), polyethyleneterephthalate (PET), polyethylenenapthalate (PEN), polyestersulfone (PES), polyolefins, and/or combinations thereof.

The substrate 20 and/or the substrate 22 may also be selected from a material that is transparent, or from a material that is opaque. The selection may depend, at least in part, on how the visible image is produced. For example, if the display element 10 uses reflectivity to form visible images, the display 10 requires light to pass through one of the substrates 20, 22, but the other of the substrate(s) 22, 20 may be selected from an opaque material. In some instances, the display element 10 may also be used on top of or over another display element 10 or another image. In these instances, the substrate(s) 20, 22 may be selected from transparent materials.

In still another example (not shown), the substrate 20 may be formed from a conducting or a semiconducting material. In this example, the display element 10 may be configured so that the substrate 20 functions as the electrode 16. In this configuration, the display element 10 does not include a separate substrate 20. Examples of suitable conducting materials for the substrate 20/electrode 16 include stainless steel, metallic foils, and/or the like. An example of a suitable semiconducting material for the substrate 20/electrode 16 is a silicon wafer.

In still other examples, it may be desirable that the substrate 20 and/or 22 be reflective or include a reflective coating thereon.

In the example shown in FIGS. 1A and 1B, the display element 10 further includes a dielectric layer 24. This dielectric layer 24 is deposed between the electrodes 16, 18, and in this example, is established on the electrode 16. In an example, the dielectric layer 24 is an optically transparent material, examples of which include thermally and UV-curable, imprintable resins, photoresists, inorganic dielectrics, and/or combinations thereof.

The dielectric layer 24 includes at least one reservoir 26 defined therein. In some instances, the dielectric layer 24 includes a single reservoir 26 in each display element 10. Such a configuration may be useful, for example, for display elements 10 that produce a single color. In other instances, more than one reservoir 26 may be defined in the dielectric layer 24 for each display element 10. Additional reservoirs 26 may be desirable, for example, to optimize the optical contrast of the images, increase a switching speed of the display and/or to enable use of more than one type of dispersant molecule within each display element 10. The additional reservoirs 26 may, in an example, be formed in a periodic lattice arrangement or in an aperiodic stochastic arrangement. Periodic lattice arrangements typically have relatively uniform reservoir spacing, which tends to optimize switching uniformity. Aperiodic lattice arrangements, on the other hand, have random reservoir spacing, which tends to avoid interference patterns that may occur due, at least in part, to overlapping periodic lattices.

Furthermore, the reservoirs 26 may include line structures, dot structures, two-dimensional areas, three-dimensional shapes, fractal shapes, or combinations thereof. The reservoirs 26 may be formed into the dielectric layer 24 by patterning the dielectric layer 24 using imprinting, photolithography, or some other suitable technique. It is to be understood that the reservoirs 26 may be patterned into the dielectric layer 24 to provide fluid communication between the viewing area VA of the display element 10 and the underlying electrode 16.

It is to be understood that the present examples are not to be limited in either shape or size of the reservoirs 26, as long as they satisfy the aperture, optical contrast and other operating requirements of the display element 10. The reservoirs 26 can be formed in circles, triangles, squares, rectangles, diamonds, stars, cones, inverse pyramids, or any other shape. Similarly, there is no requirement that all of the reservoirs 26 be the same size. As alluded to above, the reservoirs 26 can be sized such that size varies in either a periodic or an aperiodic stochastic fashion. The reservoirs 26 may also be randomly sized in a single segment or pixel.

Dot structures that are small compared to the area of the display element 10 can be considered zero dimensional shapes. Line structures that have one dimension substantially larger than the other can be considered one dimensional shapes. Reservoirs 26 with a cross-sectional area that is significant compared to the area of the display element 10 can be considered two dimensional areas. Reservoirs 26 with non-vertical walls as well as features with protrusions into the viewing area VA can be considered three dimensional shapes.

The reservoir 26 shape and arrangement affects, for example, the clear aperture not taken up by the reservoirs 26. Higher clear apertures result in a brighter (e.g., if a reflector is present) or more transparent display in the clear state.

In an example, the reservoir(s) 26 has/have a predetermined depth that extends through a thickness of the dielectric layer 24 and provides a volume of free space inside the display element 10 for collecting charged colorant particles 14, which are present in the electronic ink 12, during one or more stages of an addressing sequence for the display.

In order to maximize the optical contrast between a clear or transparent state (see, e.g., FIG. 1B, where the charged colorant particles 14 are compacted inside the reservoir(s) 26) of the display element 10 and a dark, colored, or opaque state (see, e.g., FIG. 1A, where the charged colorant particles 14 are spread across the viewing area VA) of the display element 10, the total area of the reservoir(s) 26 is also substantially less than a total area of the display element 10. The area of the reservoir(s) 26 generally affects a brightness capability of the display in the clear state since the compacted charged colorant particles 14 absorb light therein. In one example, the total area of the reservoir(s) 26 is less than about 50% of the total area of the display element 10. In another example, the total area of the reservoir(s) 26 is less than about 30% of the total area of the display element 10. In still another example, the total area of the reservoir(s) 26 is less than about 20% of the total area of the display element 10. In an even further example, the total area of the reservoir(s) 26 is less than about 10% of the total area of the display element 10. In yet another example, the total area of the reservoir(s) 26 ranges from about 1% to about 10% of the total area of the display element 10.

It is to be understood that the dielectric layer 24 may also be patterned with multiple dimensional shapes or fractal shapes. This patterning includes patterning the dielectric layer 24 to include walls (not shown) that together with the electrodes 16, 18 define the viewing area VA.

As illustrated in FIGS. 1A and 1B, the display element 10 may also include thin, self-aligned layers 15 formed on the surface of the electrode 16 within the reservoirs 26. The thickness of each of the thin layers 15 is less than the thickness of dielectric layer 24. In an example, the thin layers 15 are metal layers, such as Ni, Cu, Au, Pd, or another suitable metal that is capable of being electroplated onto the electrode 16 within each reservoir 26. In another example, the portions of the electrode 16 within each reservoir 26 are anodized, which provides the thin layers 15 and passivation for the electrode 16. In still another example, the thin layers 15 are plated dielectric layers that prevent direct electrical contact between electrode 16 and the electronic ink 12.

The display element 10 includes an example of the electronic ink 12 disclosed herein. The ink 12 includes the charged colorant particles 14. In the example shown in FIGS. 1A and 1B, the charged colorant particles 14 are negatively charged. The electronic ink 12 is disposed in the viewing area(s) VA, which is in fluid communication with the reservoirs 26. The electronic ink 12 may fill up the entire viewing area VA and the reservoirs 26. In response to a sufficient electric potential or field, the charged colorant particles 14 move and/or rotate to various spots within the viewing area VA, the reservoir 26, or both in order to produce desired visible images during one or more stages of an addressing sequence.

Once the electronic ink 12 is disposed in the viewing area(s) VA, the structure of the display element 10 is completed by establishing the other electrode 18 (and in some instances also the substrate 22) thereon.

In the examples shown in FIGS. 1A and 1B, the charged colorant particles 14 in the electronic ink 12 can be controlled by applying attractive or repulsive bias conditions to the electrode 16. The electrode 18 assists in controlling the charged colorant particles 14 distribution.

FIG. 1A illustrates an example of the display element 10 when pulses or no bias is applied to the electrode 16 relative to the electrode 18. This state of the display element 10 is the dark state or non-clear optical state. In this dark state, the charged colorant particles 14 in the ink 12 relatively uniformly distribute across the viewing area VA.

However, when a positive bias is applied to the electrode 16 relative to a reference bias applied to the electrode 18, the current flows through the display element 10 and the negatively charged colorant particles 14 are attracted to the electrode 16 and into the reservoirs 26. In passive addressing, it is to be understood that electrode 16 may be maintained below a threshold voltage while electrode 18 provides additional voltage to overcome the threshold value and move the charged colorant particles 14. In active addressing, it is to be understood that the electrode 18 may be maintained below a threshold voltage while the selected pixel electrodes (e.g., electrode 16) provide additional voltage to overcome the threshold value and move the charged colorant particles 14. Regardless of the type of addressing that is used, this state of the display element 10 is the clear optical state (see FIG. 1B).

The negatively charged colorant particles 14 can be electrophoretically and convectively moved to electrode 16 and held there by the positive bias applied to electrode 16 relative to electrode 18. In one example, the convective flow is a transient effect caused by the ionic mass transport in non-polar carrier fluid of the ink 12, without charge transfer between the carrier fluid and electrode 16. In this case, the convective flow proceeds for a finite amount of time and facilitates the compaction of charged colorant particles 14 on the thin layers 15. After compaction, charged colorant particles 14 are held on thin layers 15 within the reservoirs 26 by electrostatic forces generated by a coupling with the electrode 16.

In another example, the convective flow is induced by ionic mass transport in carrier fluid of the electronic ink 12 and by charge transfer between the carrier fluid and electrodes 16, 18. The charge transfer may occur when the non-polar carrier fluid is electrically coupled to the electrodes 16, 18 through direct contact with the electrodes 16, 18 or when separated from the electrodes 16, 18 by an intermediate layer (e.g., thin layers 15). In the latter case, charge transfer is facilitated by the internal electrical conductivity of the intermediate layer, either volumetric or via pinholes and other defects.

When the electronic ink 12 is a dual color ink that includes two oppositely charged colorant particles 14, the display element 10 may include interdigitated electrodes in place of electrode 16 and a blanket electrode as electrode 18. In this example, the electrode 18 is a grounded or reference electrode that operates in conjunction with one of the interdigitated electrodes to move one of the charged dispersant molecules in the dual color ink, and that operates in conjunction with the other of the interdigitated electrodes to move the other of the charged dispersant molecules in the dual color ink.

Figure 2:
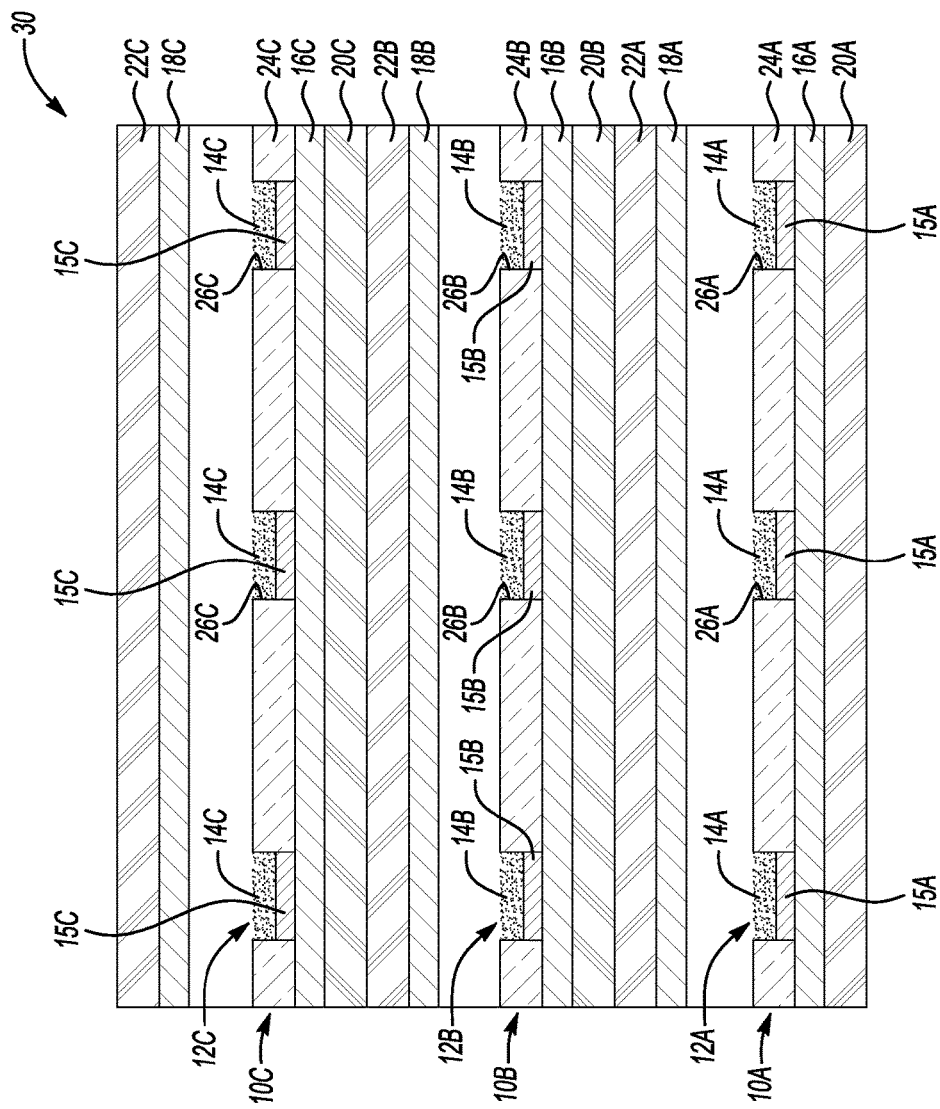
FIG. 2 is a cross-sectional, semi-schematic view of an example of a stacked display element.

FIG. 2 illustrates an example of a stacked display element 30, including three display elements $10_A$, $10_B$, and $10_C$ stacked on top of one another. The respective display elements $10_A$, $10_B$, and $10_C$ are similar to the display element 10 described in reference to FIGS. 1A and 1B, and thus, may include electronic inks $12_A$, $12_B$, $12_C$ (with charged colorant particles $14_A$, $14_B$, $14_C$), thin layers $15_A$, $15_B$, $15_C$, electrodes $16_A$, $16_B$, $16_C$, electrodes $18_A$, $18_B$, $18_C$, substrates $20_A$, $20_B$, $20_C$, substrates $22_A$, $22_B$, $22_C$, dielectric layers $24_A$, $24_B$, $24_C$, and reservoirs $26_A$, $26_B$, $26_C$. In an example, each of the display elements $10_A$, $10_B$, and $10_C$ may include a different color ink, such as cyan in display element $10_A$, magenta in display element $10_B$, and yellow in display element $10_C$.

In the example illustrated in FIG. 2, the three display elements $10_A$, $10_B$, and $10_C$ are aligned with each other. As such, the thin layers $15_A$, $15_B$, and $15_C$ and reservoirs $26_A$, $26_B$, and $26_C$ are also aligned with each other. In this example, the clear aperture for the stacked electro-optical display element 30 is improved compared to a stacked electro-optical display without such alignment.

In an alternate example (not shown), display elements $10_A$, display elements $10_B$, and display elements $10_C$ may be offset from each other. Similarly, the various components within the display elements will be offset from each other. In this example, since the reservoirs $26_A$, $26_B$, and $26_C$ and self-aligned thin layers $15_A$, $15_B$, and $15_C$ are just a fraction of the total area of each display element $10_A$, $10_B$, and $10_C$, respectively, the clear aperture remains high regardless of the alignment.

To further illustrate the present disclosure, an example is given herein. It is to be understood that this example is provided for illustrative purposes and is not to be construed as limiting the scope of the present disclosure.

EXAMPLE 1

A comparative ink (i.e., control) and several electronic inks were prepared.

The comparative ink included a cyan pigment containing sulfonate functionality extracted from an aqueous dispersion, a mixture of polyisobutylene succinimide (referred to as additive A) and polyhydroxystearic amide salt (referred to as additive B), and an isoparaffinic fluid (as the carrier fluid). The additives in the comparative ink dispersed the pigments and provided charging.

The examples of the electronic inks included different examples of the colorant particle dispersion disclosed herein, each of which had the colorant particle(s) bonded to dispersant molecule(s) having sulfonic acid-bearing or/and carboxylic acid pendant groups covalently bonded to a central chromophore. The colorant particle dispersions are labeled D1-D27. The electronic inks included additive C (i.e., butanedioic acid, 2-sulfo-,1,4-tridecyl ester, barium salt with barium hydrogen phosphate (2:1)) or a combination of additives A and C. The carrier fluid was an isoparaffinic fluid.

Table 1 illustrates the formulations for both the comparative ink and each of the example electronic inks.

TABLE 1

| Ink | Pigment or Disp. Type | Pigment or Disp. Type Amount (wt. %) | Additive Type | Additive (wt. %) | Carrier Fluid |
|---|---|---|---|---|---|
| Comp | cyan w/ sulfonate groups | 2 | A&B | 3.5 | Balance |
| 1 | D1 | 20 | C | 0.5 | Balance |
| 2 | D2 | 20 | C | 0.5 | Balance |
| 3 | D3 | 20 | C | 0.5 | Balance |
| 4 | D4 | 20 | C | 0.5 | Balance |
| 5 | D5 | 20 | C | 0.5 | Balance |
| 6 | D6 | 20 | C | 0.5 | Balance |
| 7 | D7 | 20 | C | 0.5 | Balance |
| 8 | D4 | 15 | C | 0.5 | Balance |
| 9 | D5 | 15 | C | 0.5 | Balance |
| 10 | D6 | 15 | C | 0.5 | Balance |
| 11 | D5 | 15 | C | 1 | Balance |
| 12 | D6 | 15 | C | 1 | Balance |
| 13 | D8 | 15 | C | 0.5 | Balance |
| 14 | D9 | 15 | C | 0.5 | Balance |
| 15 | D10 | 15 | C | 0.5 | Balance |
| 16 | D11 | 15 | C | 0.5 | Balance |
| 17 | D12 | 15 | C | 0.5 | Balance |
| 18 | D13 | 15 | C | 0.5 | Balance |
| 19 | D14 | 15 | C | 0.5 | Balance |
| 20 | D15 | 15 | C | 0.5 | Balance |
| 21 | D16 | 15 | C | 0.5 | Balance |
| 22 | D17 | 15 | C | 0.5 | Balance |
| 23 | D18 | 15 | C | 0.5 | Balance |
| 24 | D19 | 15 | C | 0.5 | Balance |
| 25 | D20 | 15 | C | 0.5 | Balance |
| 26 | D21 | 15 | C | 0.5 | Balance |
| 27 | D22 | 15 | C | 0.5 | Balance |
| 28 | D23 | 15 | C | 0.5 | Balance |
| 29 | D18 | 15 | A&C | 1 | Balance |
| 30 | D23 | 15 | A&C | 1 | Balance |
| 31 | D24 | 15 | A&C | 0.75 | Balance |
| 32 | D25 | 15 | A&C | 0.75 | Balance |
| 33 | D26 | 15 | A&C | 1 | Balance |
| 34 | D27 | 15 | A&C | 1 | Balance |

Some of the dispersions D1-D27 were made with one or more precursor products. The procedures for making the precursor products and the dispersions D1-D27 will now be provided.

Precursor Products A and B

Copper phthalocyanine crude (from Sun Chemical), finely powdered sodium chloride (containing about 2% $Ca_3(PO_4)_2$), and diethylene glycol were mixed in a ratio of 1:8:1.16 at a temperature of up to 120° C. for a period of 10 hours in a mix muller. This product is referred to throughout this example as "precursor product A".

Precursor product A, water, and 30% aqueous HCl were stirred in a ratio of 1:6:0.6. The mixture was heated to 90° C. for one hour, and was then filtered while hot. The filter cake was washed with more water until the filtrate pH became neutral and its conductivity was the same as the wash water. The cake was then re-slurried in deionized water (5 times the amount of dry equivalent) and stirred overnight. The slurry was filtered, and washed with more deionized water until the conductivity of the filtrate was 4.5 micro Siemens. The cake was dried in an oven at 80° C. overnight. This product is referred to throughout these examples as "precursor product B"

D1

A mixture of 15.00 g of precursor product B, 1.50 g of methanol repurified form of a neutralized monosulfonated copper phthalocyanine, 3 g of a polymeric hydroxylated stearamide, and 130.50 g of ISOPAR®-L was made in an 8 oz glass jar. To this, 75 g of 1 mm ceramic media was added. The mixture was shaken on a paint shaker for one hour. The ceramic media were removed and the resulting dispersion was filtered through a 1.2 micron filter.

D2

A mixture of 15.00 g of precursor product B, 1.50 g of non-repurified form of a neutralized monosulfonated copper phthalocyanine, 3 g of a polymeric hydroxylated stearamide, and 130.50 g of ISOPAR®-L was made in an 8 oz glass jar. To this, 75 g of 1 mm ceramic media was added. The mixture was shaken on a paint shaker for one hour. The ceramic media were removed and the resulting dispersion was filtered through a 1.2 micron filter.

D3

25 g of Pigment Blue 15:3 (249-1284), 0.5 g of phthalimidomethyl copper phthalocyanine, 250 g of sodium chloride, and 50 g of propylene glycol were charged into a kneader. This mixture was blended for 6.5 hours, then 21 g of $CuPc\text{-}(SO_3H)_{1.3}(SO_2NH\text{-polymer})_{1.0}$ (throughout this Example, the polymer in this structure was KEROCOM® O3 (i.e., KEROCOM® PIBSI), BASF Corp., Mw about 1500, Mn about 100, and polydispersity about 1.5) mixed with Magie oil 47 (solids content 60%) was added, and the mixture was mixed for another hour. The mixture was discharged and slurried in water and acid. The slurry was heated to 90° C. for an hour, then filtered, washed with water, then washed with deionized water, and finally washed with isopropanol before it was dried in an oven. Yield=33.5 g A mixture of 17.30 g of the preceding material, 114 g of ISOPAR®-L, and 66 g of 1 mm ceramic media were shaken on a paint shaker for 1 hour. The media was removed and the resulting dispersion was filtered through a 1.2 micron filter.

D4

A mixture of 220 g of precursor product A, 0.43 g of phthalimidomethyl copper phthalocyanine, 11.42 g of CuPc-$(SO_3H)_{1.3}(SO_2NH\text{-polymer})_{1.0}$ (active content=60%) and 10 g of diethylene glycol were mixed in a lab kneader for 1 hour. The resulting mixture was slurried in water and HCl at 90° C. for 90 minutes. The slurry was then filtered and washed with tap water until the pH of the filtrate became neutral. The filter cake was reslurried in isopropanol at ambient temperature for 30 minutes, then filtered and washed with deionized water until the conductivity of the filtrate was 24 micro Siemens. The product was dried in an oven overnight.

A mixture of 17.30 g of the preceding material and 114 g of ISOPAR®-L and 66 g of 1 mm ceramic media were shaken on a paint shaker for 1 hour. The media was removed and the resulting dispersion was filtered through a 1.2 micron filter.

D5

A mixture of 220 g of precursor product A, 0.43 g of phthalimidomethyl copper phthalocyanine, 22.84 g of CuPc-$(SO_3H)_{1.3}(SO_2NH\text{-polymer})_{1.0}$ (active content=60%) and 10 g of diethylene glycol were mixed in a lab kneader for 1 hour. The resulting mixture was slurried in water and HCl at 90° C. for 90 minutes. The slurry was then filtered and washed with tap water until the pH of the filtrate became neutral. The filter cake was reslurried in isopropanol at ambient temperature for 30 minutes, then filtered and washed with deionized water until the conductivity of the filtrate was 24 micro Siemens. The product was dried in an oven overnight.

A mixture of 17.30 g of the preceding material and 114 g of ISOPAR®-L and 66 g of 1 mm ceramic media were shaken on a paint shaker for 1 hour. The media was removed and the resulting dispersion was filtered through a 1.2 micron filter.

D6

A mixture of 220 g of precursor product A, 0.43 g of phthalimidomethyl copper phthalocyanine, 17.13 g of CuPc-$(SO_3H)_{1.3}(SO_2NH$-polymer$)_{1.0}$ (active content=60%) and 10 g of diethylene glycol were mixed in a lab kneader for 1 hour. The resulting mixture was slurried in water and HCl at 90° C. for 90 minutes. The slurry was then filtered and washed with tap water until the pH of the filtrate became neutral. The filter cake was reslurried in isopropanol at ambient temperature for 30 minutes, then filtered and washed with deionized water until the conductivity of the filtrate was 24 micro Siemens. The product was dried in an oven overnight.

A mixture of 17.30 g of the preceding material and 114 g of ISOPAR®-L and 66 g of 1 mm ceramic media were shaken on a paint shaker for 1 hour. The media was removed and the resulting dispersion was filtered through a 1.2 micron filter.

D7

The process for preparing D6 was repeated, except that the initial ISOPAR®-L dispersion was milled for two hours using a Silverson L5M-A rotor-stator mixer in the presence of 50 micron polymethyl methacrylate media. Then the resulting dispersion was filtered through a 1.2 micron filter.

D8

A mixture of 220 g of precursor product A, 0.43 g of phthalimidomethyl copper phthalocyanine, 17.13 g of CuPc-$(SO_3H)_{1.3}(SO_2NH$-polymer$)_{1.0}$ (active content=60%) and 10 g of diethylene glycol were mixed in a lab kneader for 1 hour. The resulting mixture was slurried in water and HCl at 90° C. for 90 minutes. The slurry was then filtered and washed with tap water until the pH of the filtrate became neutral. The filter cake was reslurried in isopropanol at ambient temperature for 30 minutes, then filtered and washed with deionized water until the conductivity of the filtrate was 24 micro Siemens. The cake was then reslurried in distilled water having a conductivity of 4 micro Siemens, filtered and washed with distilled water. The product was dried in an oven overnight.

A mixture of 51.31 g of the preceding product, 350 g of ISOPAR®-L and 194.5 g of 1 mm ceramic media were shaken in an 8 oz jar on a paint shaker for 1 hour. The media were removed and the resulting dispersion was filtered through a 1.2 micron filter.

D9

The process for preparing D8 was repeated, except that after removing the media from the dispersion, the dispersion was milled using a Silverson L5M-A rotor-stator mixer in the presence of 50 micron polymethyl methacrylate media for two hours. Then the resulting dispersion was filtered through a 1.2 micron filter.

D10

A mixture of 21.0 g of copper phthalocyanine pigment, 174 g of sodium chloride, 28.3 g of diethylene glycol, and 0.43 g of phthalimidomethyl copper phthalocyanine was mixed in a laboratory kneader for 1 hour at ambient temperature. To this mixture, 17.13 g of CuPc-$(SO_3H)_{1.3}$ $(SO_2NH$-polymer$)_{1.0}$ (60% active) was added, and the mixture was kneaded for 30 minutes. The mixture was slurried in 2500 ml of tap water containing 25 g of 30% HCl, and was stirred at 90° C. for 1 hour. The slurry was filtered and washed with warm tap water until the pH of the filtrate became neutral and its conductivity was the same as the wash water. The mixture was slurried in 1 L of isopropanol for 1 hour, then filtered and washed with isopropanol. The material was then reslurried in deionized water, followed by filtration and washing until the conductivity of the filtrate was <10 micro Siemens. The material was further slurried in distilled water (4 micro Siemens) and filtered and dried in a vacuum oven at 100° C. overnight.

49.13 g of the preceding product was combined with 335.16 g of ISOPAR®-L and 186 g of 1 mm ceramic media. The mixture was shaken for one hour on a paint shaker. The media was removed and the resulting dispersion was filtered through a 1.2 micron filter.

D11

The process for preparing D10 was repeated, except that after removing the ceramic media from the dispersion, the dispersion was milled using a Silverson L5M-A rotor-stator mixer in the presence of 50 micron polymethyl methacrylate media for two hours. Then the resulting dispersion was filtered through a 1.2 micron filter.

D12-D22

Into a lab kneader were charged 220 g of precursor product A, 0.43 g of phthalimidomethyl copper phthalocyanine, a sufficient quantity of diethylene glycol to achieve a thick paste, and 10.27 g of an additive having the description given in Table 2.

TABLE 2

Additive Structure: CuPc-$(SO_3H)_x(SO_2NH$-polymer$)_y$

| Dispersion | x in additive | y in additive |
|---|---|---|
| D12 | 0.15 | 0.58 |
| D13 | 0 | 0.73 |
| D14 | 0 | 0.73 |
| D15 | 0.37 | 1.0 |
| D16 | 0 | 1.37 |
| D17 | 0.18 | 1.19 |
| D18 | 0.2 | 1.0 |
| D19 | 1.2 | 1.0 |
| D20 | 0.6 | 1.6 |
| D21 | 0 | 2.2 |
| D22 | 1.3 | 1.0 |

The mixture was blended for 1 hour and then discharged. The process was repeated and the combined products were mixed with 2 L of isopropanol until a smooth slurry was obtained. The slurry was then filtered and washed with an additional 2 L of isopropanol. The wet filter cake was slurried in 2.5 L of water and 25 g of 36.5% HCl at 90° C. for 1 hour. The slurry was filtered and washed with additional tap water until the pH of the filtrate became neutral and the conductivity matched that of the wash water, and then the slurry was washed with deionized water. The product was reslurried in deionized water and then filtered and washed until the conductivity of the filtrates were the same as the deionized wash water. The product was then dried in a vacuum oven overnight at 80° C.

50 g of the dried material was combined with 329 g of ISOPAR®-L and 189 g of 1 mm ceramic media and shaken for 1 hour on a paint shaker. The media was removed and the resulting dispersion was filtered through a 1.0 micron cartridge filter.

D23

A mixture of 220 g of precursor product A, 0.43 g of phthalimidomethyl copper phthalocyanine, 17.13 g of CuPc-$(SO_3H)_{1.3}(SO_2NH\text{-polymer})_{1.0}$ (active content=60%) and 10 g of diethylene glycol was mixed in a lab kneader for 1 hour. This procedure was carried out 10 times and the products were combined. The resulting mixture was slurried in water and HCl at 90° C. for 90 minutes. The slurry was then filtered and washed with tap water until the pH of the filtrate became neutral. The filter cake was reslurried in isopropanol at ambient temperature for 30 minutes, and then was filtered and washed with deionized water until the conductivity of the filtrate was 24 micro Siemens. The product was dried in an oven overnight.

50 g of the preceding dry pigment was mixed with 500 g of deionized water, 46.68 g of isopropanol and 50 g of 36.5% HCl. The mixture was agitated vigorously with an IKA T25 rotor stator mixer for 1 hour at 13000 RPM, then heated to 90° C. for 2 hours. The slurry was filtered and washed with 2 L of a solution prepared by mixing concentrated HCl into deionized water until the pH was 1.0. The wet cake was dried in an oven at 80 C overnight.

The dry product was combined with 285 g of ISOPAR®-L and 167.48 g of 1 mm ceramic media and was shaken for 1 hour on a paint shaker. The media was removed and the dispersion was filtered through a 1.0 micron cartridge filter.

D24

A mixture of 220 g of precursor product A, 0.43 g of phthalimidomethyl copper phthalocyanine, 8.55 g of CuPc-$(SO_3H)_{1.3}(SO_2NH\text{-polymer})_{1.0}$ (active content=60%), and 7.45 g of CuPc-$(CO_2H)_{1.3}(CONH\text{-polymer})_{1.0}$ (active content=68.78%) were mixed in a laboratory kneader for 1 hour. The resulting mixture was slurried in 1 L of isopropanol and blended with an IKA T25 rotor stator mixer for 30 minutes. The slurry was filtered and washed with 1 L isopropanol. The cake was reslurried in tap water containing 25 g of 36.5% HCl at 90° C. for 1 hour, and then was filtered and washed with tap water until the pH of the filtrates became neutral. The cake was reslurried by stirring in deionized water for 1 hour, then filtered, and washed with additional deionized water until the conductivity of the filtrates became equal to the deionized washing water. The product was oven dried.

20 g of the dried material was mixed with 114 g of ISOPAR®-L and 70 g of 1 mm ceramic media. The media was removed. The entire process of this example was repeated and the combined dispersions were filtered through a 1.0 micron cartridge filter.

D25-D27

Into a lab kneader were charged 220 g of precursor product A, 0.43 g of phthalimidomethyl copper phthalocyanine, a sufficient quantity of diethylene glycol to achieve desired consistency, and 10.27 g of an additive having the description given in Table 3.

TABLE 3

Additive Structure: CuPc-$(SO_3H)_x(SO_2NH\text{-polymer})_y$.

| Dispersion | x in additive | y in additive |
|---|---|---|
| D25 | 1.8 | 1.0 |
| D26 | 0.9 | 1.9 |
| D27 | 0 | 2.8 |

The mixture was blended for 1 hour and then discharged. The process was repeated and the combined products were mixed with 2 L of isopropanol until a smooth slurry was obtained. The slurry was then filtered and washed with an additional 2 L of isopropanol. The wet filter cake was slurried in 2.5 L of water and 25 g of 36.5% HCl at 90° C. for one hour. The slurry was filtered and washed with additional tap water until the pH of the filtrate became neutral and the conductivity matched that of the wash water, and then was washed with deionized water. The product was reslurried in deionized water and then filtered and washed until the conductivity of the filtrates were the same as the deionized wash water. The product was then dried in a vacuum oven overnight at 80° C.

50 g of the dried material was combined with 285 g of ISOPAR®-L and 167 g of 1 mm ceramic media and shaken for 1 hour on a paint shaker. The media was removed and the resulting dispersion was filtered through a 1.0 micron cartridge filter.

The comparative ink and example inks 1-34 were tested in respective test cells, each of which included electrodes. The inks were tested under electric field either through cycles of switching or held at a light state. The life time performance of each of the comparative and electronic inks was observed.

Figure 3:
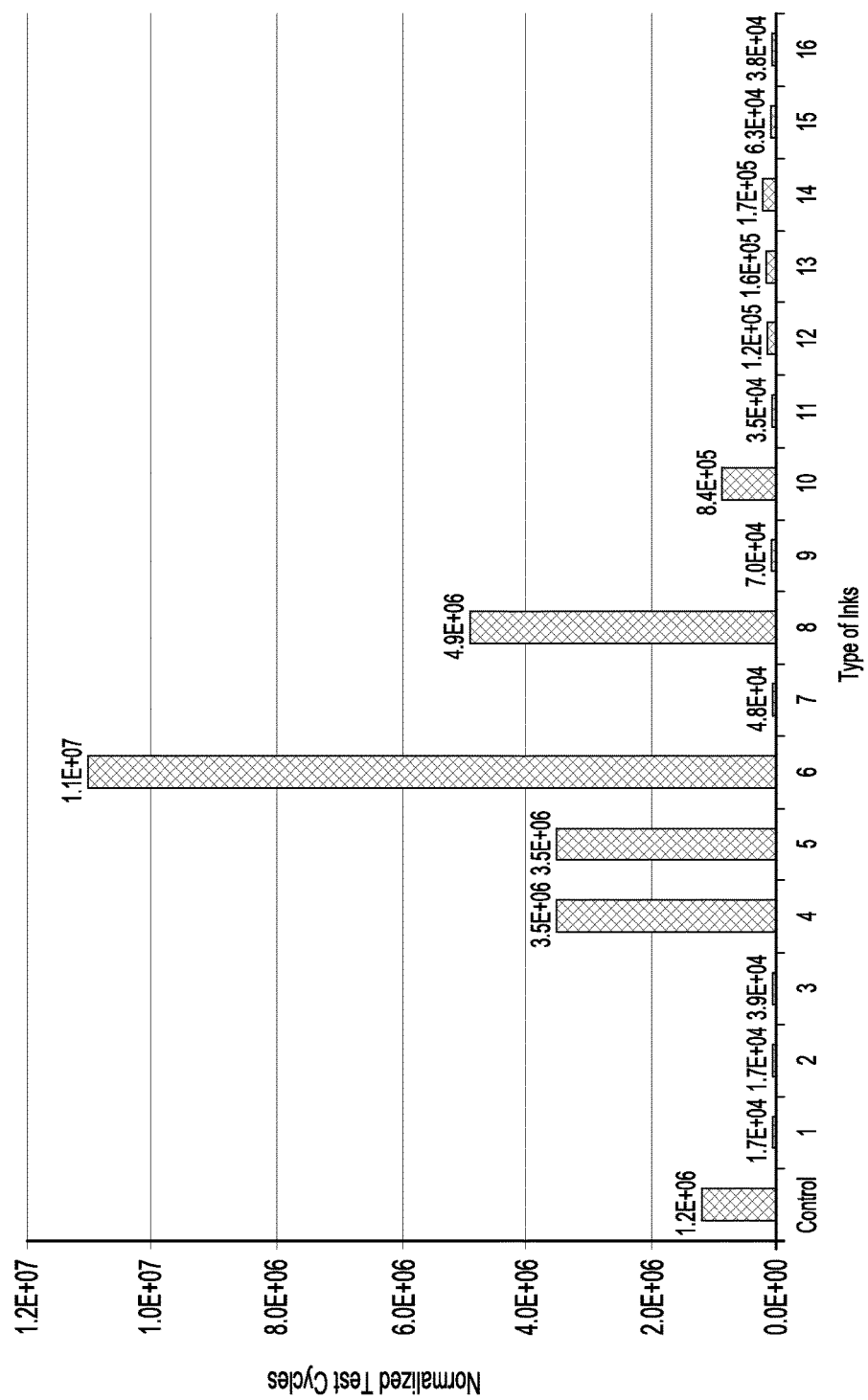
FIG. 3 is a graph depicting the lifetime of a comparative ink and inks 1-16 of the Example in normalized test cycles.
Figure 4:
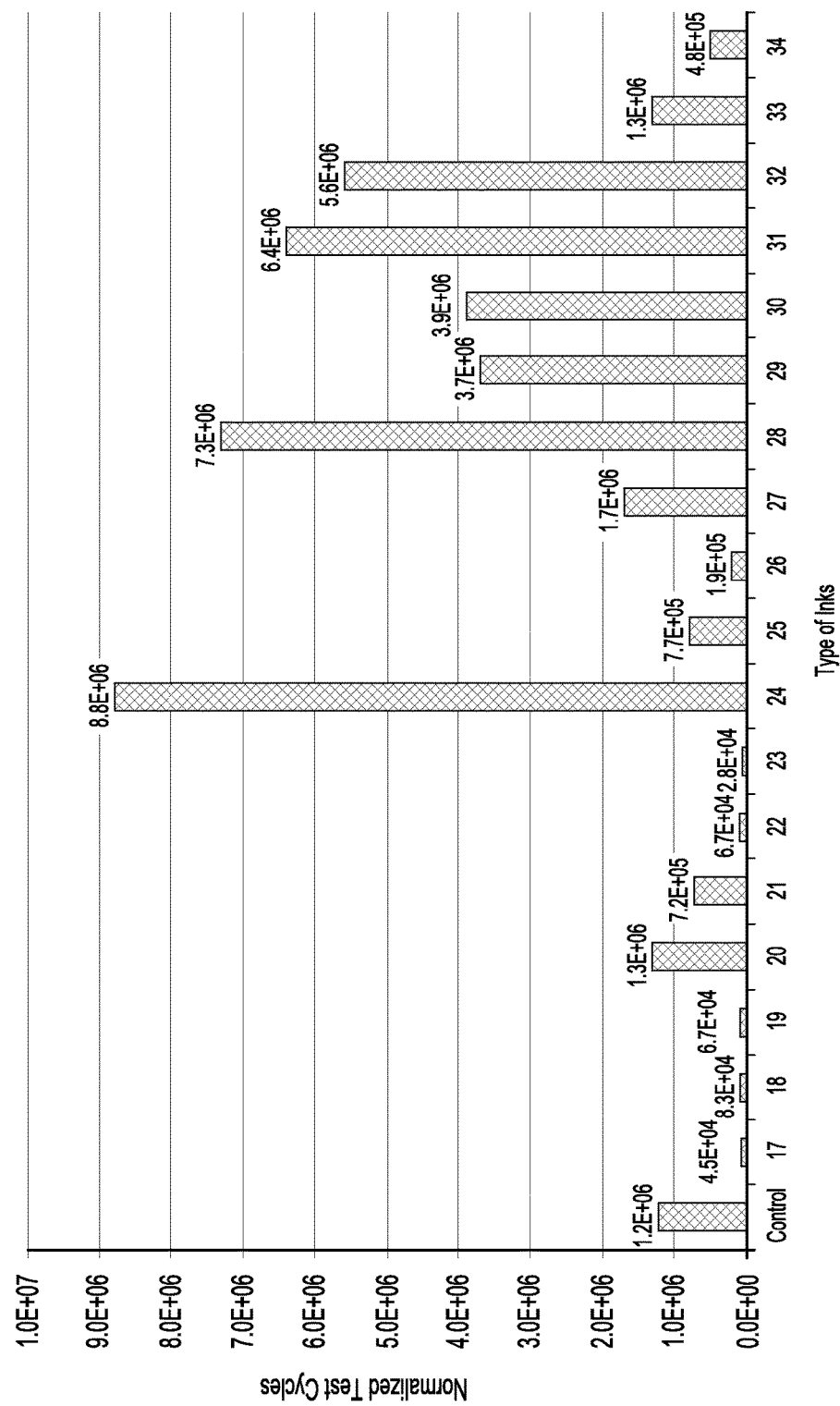
FIG. 4 is a graph depicting the lifetime of the comparative ink and inks 17-34 of the Example in normalized test cycles.
Figure 5:
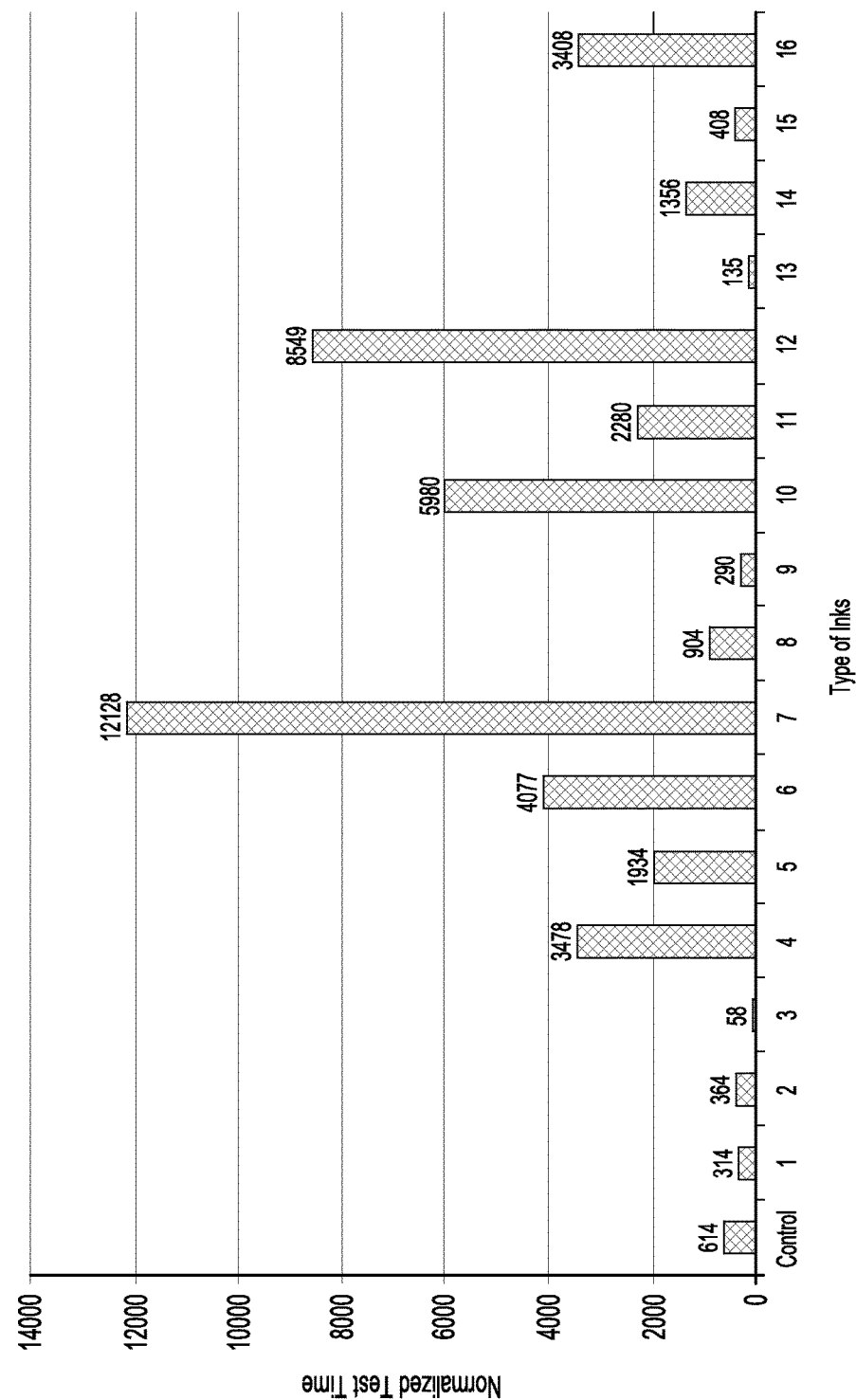
FIG. 5 is a graph depicting the lifetime of the comparative ink and inks 1-16 of the Example in normalized test time.
Figure 6:
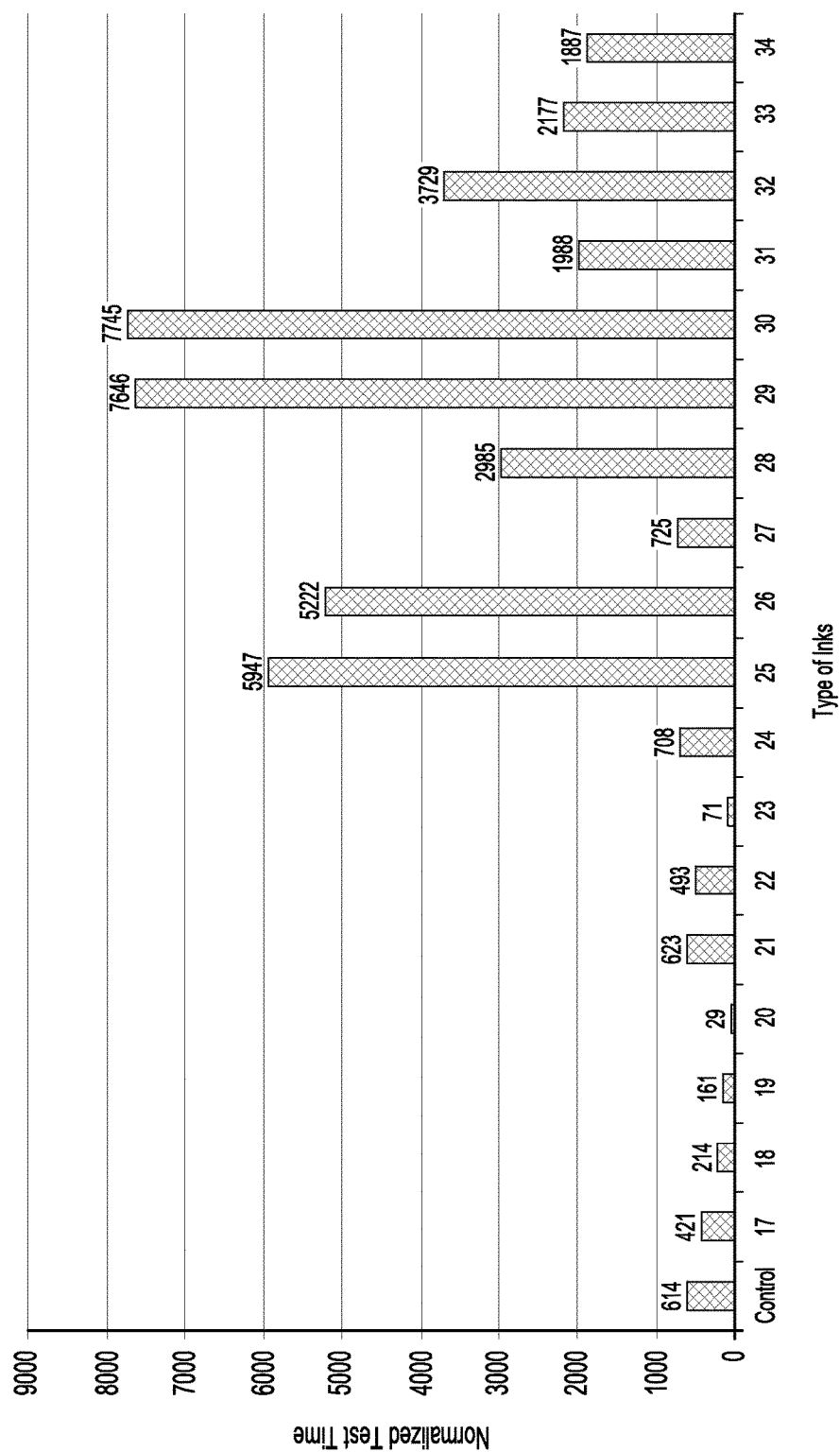
FIG. 6 is a graph depicting the lifetime of the comparative ink and inks 17-34 of the Example in normalized test time.
Figure 7:
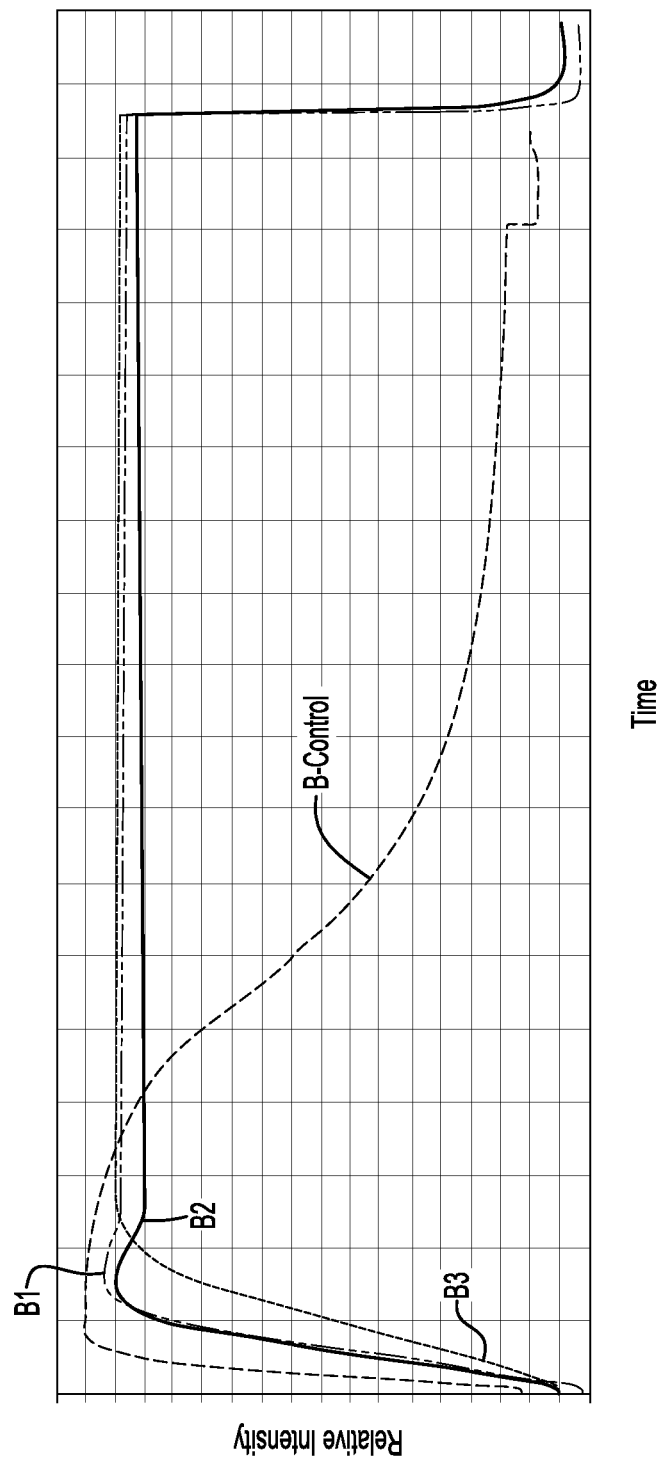
FIG. 7 is a graph illustrating the effect of an oligomeric additive on the persistence of a light state in examples of the electronic ink.

FIGS. 3 and 5 illustrate, respectively, the normalized test cycles and normalized test time for the comparative example and for inks 1-16. FIGS. 4 and 6 illustrate, respectively, the normalized test cycles and normalized test time for the comparative example and for inks 17-34. The contrast relative to the initial contrast was obtained at intervals of normalized test cycles and time for each of the inks. The horizontal axis in each of FIGS. 3 through 6 represents the different inks from Table 1. The vertical axis in FIGS. 3 and 4 is the normalized test cycles of switching, and the vertical axis in FIGS. 5 and 6 is the normalized test time held at a light state. Many of the electronic inks including the colorant particle dispersions with particle(s) having attached dispersant molecules have superior life times (in terms of cycle and/or time) when compared to the comparative example.

For inks 17-19 and 20-22, the x and y of the additive may be used to modify the performance of the ink, as illustrated in the results.

It is to be understood that the data reported for inks 31 and 32 in FIG. 4 was taken while the tests were still on-going.

Color measurements were also taken for three of the inks (i.e., Inks 1-3). The results indicated that the color measurements for all of the tested inks exceeded the SNAP (Specifications for Newsprint Advertising Production) and SWOP (i.e., Specifications for Web Offset Publications) standards. The results for inks 1-3 are shown in Table 4.

TABLE 4

|  | SNAP | SWOP | Ink 1 | Ink 2 | Ink 3 |
|---|---|---|---|---|---|
| L* | 56.58 | 56.63 | 60.13 | 60.22 | 56.75 |
| C* | 35.32 | 55.79 | 61.94 | 60.92 | 60.11 |
| a* | −23.4 | −37.92 | −49.33 | −48.75 | −40 |
| b* | −26.45 | −40.92 | −37.46 | −36.53 | −44.87 |

EXAMPLE 2

A control ink and examples of the electronic ink disclosed herein were prepared in order to demonstrate the effect of oligomeric additives on the persistence of a light state. The control and the example inks were prepared with dispersion type D18 described in Example 1 and one or more of additive C from Example 1, polybutene with Mn of 6995

(referred to as Additive D), polybutene with Mn of 10000 (referred to as Additive E), and polybutene with Mn of 8012 (referred to as Additive F). The ink formulations are shown in Table 5.

TABLE 5

| Ink | Disp. Type | Disp. Amount (wt. %) | Additive Type | Additive (wt. %) | Carrier Fluid |
|---|---|---|---|---|---|
| B-Control | D18 | 15 | C | 0.5 | Balance |
| B1 | D18 | 15 | C&D | 75.1 | Balance |
| B2 | D18 | 15 | C&E | 67.4 | Balance |
| B3 | D18 | 15 | C&F | 73.8 | Balance |

The effect of the additives on persistence of a light state is shown in FIG. 6. As illustrated, inks B1-B3, containing additive D, additive E, and additive F in addition to additive C held the light state longer than the control.

It is to be understood that the ranges provided herein include the stated range and any value or sub-range within the stated range. For example, a range from about 0.05 wt. % to about 5.0 wt. % should be interpreted to include not only the explicitly recited limits of about 0.05 wt. % to about 5.0 wt. %, but also to include individual values, such as 0.25 wt. %, 0.5 wt. %, 0.75 wt. %, etc., and sub-ranges, such as from about 0.5 wt. % to about 1.0 wt. %, from 0.2 wt. % to about 3 wt. %, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

Further, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it will be apparent to those skilled in the art that the disclosed examples may be modified. Therefore, the foregoing description is to be considered non-limiting.

What is claimed is:

1. An electronic ink, comprising:
    a non-polar carrier fluid;
    a first colorant particle dispersion, including:
        another non-polar carrier fluid, the other non-polar carrier fluid being the same as, or different from the non-polar carrier fluid;
        first colorant particles; and
        first chargeable dispersant molecules bonded to the colorant particles, wherein the first colorant particle dispersion exhibits a first color, and wherein each of the first chargeable dispersant molecules includes:
            a central chromophore;
            a chargeable pendant group bonded to the central chromophore; and
            a steric stabilization pendant group bonded to the central chromophore, wherein the steric stabilization pendant group has a structure

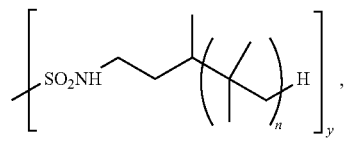

and wherein y ranges from 0.58 to 2.8 and n ranges from 10 to 20;
    a charge director to charge the first chargeable dispersant molecules;
    a second colorant particle dispersion, including:
        the non-polar carrier fluid or the other non-polar carrier fluid;
        second colorant particles; and
        second chargeable dispersant molecules bonded to the second colorant particles, wherein the second colorant particle dispersion exhibits a second color that is different than the first color.

2. The electronic ink as defined in claim 1 wherein the ink is substantially free of unattached chargeable dispersant molecules.

3. The electronic ink as defined in claim 1 wherein the charge director is chosen from polyisobutylene succinimide; polyhydroxystearic amide salt; butanedioic acid, 2-sulfo-, 1,4-tridecyl ester, barium salt with barium hydrogen phosphate; sodium di-2-ethylhexylsulfosuccinate, dioctyl sulfosuccinate, lecithin, and combinations thereof.

4. An electronic ink, comprising:
    a non-polar carrier fluid;
    a colorant particle dispersion, including:
        another non-polar carrier fluid, the other non-polar carrier fluid being the same as, or different from the non-polar carrier fluid;
        colorant particles; and
        chargeable dispersant molecules bonded to the colorant particles; and
    a charge director to charge the chargeable dispersant molecules;
    wherein each of the chargeable dispersant molecules includes:
        a central chromophore;
        a chargeable pendant group bonded to the central chromophore; and
        a steric stabilization pendant group bonded to the central chromophore,
    wherein the steric stabilization pendant group has a structure

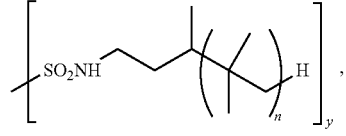

and wherein y ranges from 0.58 to 2.8 and n ranges from 10 to 20.

5. The electronic ink as defined in claim 1 wherein each of the non-polar carrier fluid and the other non-polar carrier fluid is independently chosen from hydrocarbons, halogenated or partially halogenated hydrocarbons, functionalized hydrocarbons, oxygenated fluids, siloxanes, silicone oils, organic solvents, natural oils, and combinations thereof.

6. The electronic ink as defined in claim 1 wherein the chargeable pendant group is selected from the group consisting of a carboxylic acid-containing pendant group, a sulfonic acid-containing pendant group, and combinations thereof.

7. The electronic ink as defined in claim 1 wherein:
the first chargeable dispersant molecules are positively charged; and
the second chargeable dispersant molecules are negatively charged.

8. The electronic ink as defined in claim 1 wherein:
the first chargeable dispersant molecules are positively charged; and
the second chargeable dispersant molecules are positively charged.

9. The electronic ink as defined in claim 1, further comprising an oligomeric additive present in an amount of up to 80 wt. % of a total wt. % of the electronic ink.

10. The electronic ink as defined in claim 1 wherein:
the first chargeable dispersant molecules are negatively charged; and
the second chargeable dispersant molecules are negatively charged.

11. A method for making an electronic ink, the method comprising:
selecting a first colorant particle dispersion, including:
a non-polar carrier fluid;
first colorant particles; and
first chargeable dispersant molecules bonded to the colorant particles, wherein the first colorant particle dispersion exhibits a first color, and wherein each of the first chargeable dispersant molecules includes:
a central chromophore;
a chargeable pendant group bonded to the central chromophore; and
a steric stabilization pendant group bonded to the central chromophore, wherein the steric stabilization pendant group has a structure

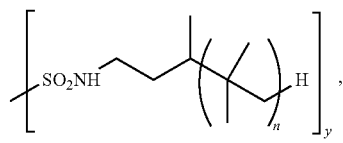

and wherein y ranges from 0.58 to 2.8 and n ranges from 10 to 20;
selecting a second colorant particle dispersion, including:
the non-polar carrier fluid or another non-polar carrier fluid, the other non-polar carrier fluid being the same as or different from the non-polar carrier fluid;
second colorant particles; and
second chargeable dispersant molecules bonded to the second colorant particles, wherein the second colorant particle dispersion exhibits a second color that is different than the first color;
incorporating the selected first colorant particle dispersion and the selected second colorant particle dispersion into additional non-polar carrier fluid, the additional non-polar carrier fluid being the same as or different from the non-polar carrier fluid and the same as or different from the other non-polar carrier fluid; and
adding a charge director to the additional non-polar carrier fluid either before or after the selected first colorant particle dispersion and the selected second colorant particle dispersion are incorporated therein, whereby the charge director imparts a charge or enhances a charge on the first and second chargeable dispersant molecules.

12. The method as defined in claim 11 wherein:
the first colorant particle dispersion is present in an amount ranging from about 5 wt. % to about 80 wt. % of a total wt. % of the electronic ink;
the charge director is present in an amount ranging from about 0.05 wt. % to about 5.0 wt. % of the total wt. % of the electronic ink; and
the additional non-polar carrier fluid and the second colorant particle dispersion make up a balance of the electronic ink.

13. A display element, comprising:
two opposed electrodes defining a viewing area therebetween;
a dielectric layer disposed between the electrodes, the dielectric layer having at least one reservoir defined therein;
an electronic ink disposed in the viewing area, the electronic ink including:
a non-polar carrier fluid;
a first colorant particle dispersion, including:
another non-polar carrier fluid, the other non-polar carrier fluid being the same as, or different from the non-polar carrier fluid;
first colorant particles; and
first chargeable dispersant molecules bonded to the colorant particles, wherein the first colorant particle dispersion exhibits a first color, and wherein each of the first chargeable dispersant molecules includes:
a central chromophore;
a chargeable pendant group bonded to the central chromophore; and
a steric stabilization pendant group bonded to the central chromophore, wherein the steric stabilization pendant group has a structure

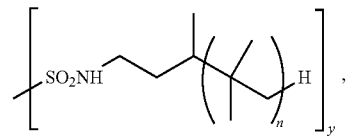

and wherein y ranges from 0.58 to 2.8 and n ranges from 10 to 20;
a charge director; and
a second colorant particle dispersion, including:
the non-polar carrier fluid or the other non-polar carrier fluid;
second colorant particles; and
second chargeable dispersant molecules bonded to the second colorant particles, wherein the second colorant particle dispersion exhibits a second color that is different than the first color;
wherein the first colorant particles having the first dispersant molecules bonded thereto and the second colorant particles having the second dispersant molecules bonded thereto are to move in response to an applied electric field.

14. The display element as defined in claim 13 wherein the chargeable pendant group is selected from the group consisting of a carboxylic acid-containing pendant group, a sulfonic acid-containing pendant group, and combinations thereof.

15. The display element as defined in claim 13 wherein the electronic ink includes:
the first colorant particle dispersion in an amount ranging from about 5 wt. % to about 80 wt. % of a total wt. % of the electronic ink;
the charge director an amount ranging from about 0.05 wt. % to about 5.0 wt. % of the total wt. % of the electronic ink; and
a balance of the non-polar carrier fluid and the second colorant particle dispersion.

16. An electronic ink, comprising:
a non-polar carrier fluid;
a first colorant particle dispersion, including:
another non-polar carrier fluid, the other non-polar carrier fluid being the same as, or different from the non-polar carrier fluid;
first colorant particles; and
first chargeable dispersant molecules bonded to the colorant particles, wherein the first colorant particle dispersion exhibits a first color, and wherein each of the first chargeable dispersant molecules includes:
a central chromophore;
a chargeable pendant group bonded to the central chromophore; and
a steric stabilization pendant group bonded to the central chromophore, wherein the steric stabilization pendant group has a structure

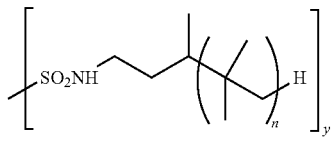

with a modification; y ranges from 0.58 to 2.8 and n ranges from 10 to 20; and the modification is one of:
gem-dimethyl groups in side-chains of the structure are replaced with hydrogen or alkyl groups; or
a branched alkyl of the structure is replaced with a straight chain alkyl; or
the branched alkyl of the structure is replaced with a poly(ethylene oxide) pendant chain or a poly(phenylene oxide) pendant chain; and
a charge director to charge the first chargeable dispersant molecules;
a second colorant particle dispersion, including:
the non-polar carrier fluid or the other non-polar carrier fluid;
second colorant particles; and
second chargeable dispersant molecules bonded to the second colorant particles, wherein the second colorant particle dispersion exhibits a second color that is different than the first color.

17. The electronic ink as defined in claim 4 wherein:
the colorant particle dispersion is present in an amount ranging from about 5 wt. % to about 80 wt. % of a total wt. % of the electronic ink;
the charge director is present in an amount ranging from about 0.05 wt. % to about 5.0 wt. % of the total wt. % of the electronic ink; and the non-polar carrier fluid makes up a balance of the electronic ink.

18. The electronic ink as defined in claim 4 wherein the chargeable dispersant molecules have the structure:

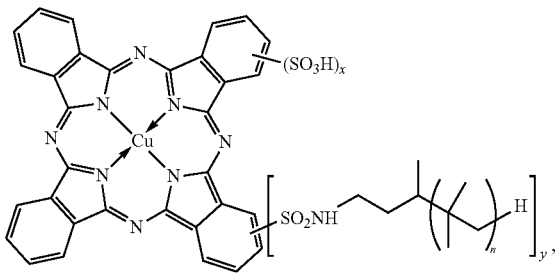

and wherein y ranges from 0.58 to 2.8, x ranges from 0 to 1.8, and n ranges from 10 to 20.

19. An electronic ink, comprising:
a non-polar carrier fluid;
a colorant particle dispersion, including:
another non-polar carrier fluid, the other non-polar carrier fluid being the same as, or different from the non-polar carrier fluid;
colorant particles; and
chargeable dispersant molecules bonded to the colorant particles; and
a charge director to charge the chargeable dispersant molecules;
wherein each of the chargeable dispersant molecules includes:
a central chromophore;
a chargeable pendant group bonded to the central chromophore; and
a steric stabilization pendant group bonded to the central chromophore, wherein the steric stabilization pendant group has a structure

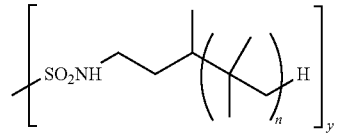

with a modification; y ranges from 0.58 to 2.8 and n ranges from 10 to 20; and
the modification is one of:
gem-dimethyl groups in side-chains of the structure are replaced with hydrogen or alkyl groups; or
a branched alkyl of the structure is replaced with a straight chain alkyl; or
the branched alkyl of the structure is replaced with a poly(ethylene oxide) pendant chain or a poly(phenylene oxide) pendant chain.

20. The electronic ink as defined in claim 4 wherein:
the chargeable pendant group is selected from the group consisting of a carboxylic acid-containing pendant group, a sulfonic acid-containing pendant group, and combinations thereof; or
the chargeable pendant group is selected from the group consisting of trialkyamines, pyridines, substituted pyridines, imidazoles, substituted imidazoles, and $R_1R_2N—$, wherein $R_1$ and $R_2$ are each independently selected from a hydrogen group, a methyl group, an ethyl group, a propyl group, an isopropyl group, a butyl group, an iso-butyl group, an n-octyl group, an n-decyl group, an n-dodecyl group, an n-tetradecyl group), and combinations thereof.

21. The electronic ink as defined in claim 4 wherein the ink is substantially free of unattached chargeable dispersant molecules.

22. The electronic ink as defined in claim 4 wherein the charge director is chosen from polyisobutylene succinimide; polyhydroxystearic amide salt; butanedioic acid, 2-sulfo-, 1,4-tridecyl ester, barium salt with barium hydrogen phosphate; sodium di-2-ethylhexylsulfosuccinate, dioctyl sulfosuccinate, lecithin, and combinations thereof.

23. The electronic ink as defined in claim 4 wherein each of the non-polar carrier fluid and the other non-polar carrier fluid is independently chosen from hydrocarbons, halogenated or partially halogenated hydrocarbons, functionalized hydrocarbons, oxygenated fluids, siloxanes, silicone oils, organic solvents, natural oils, and combinations thereof.

* * * * *

UNITED STATES PATENT AND TRADEMARK OFFICE
CERTIFICATE OF CORRECTION

PATENT NO. : 10,007,166 B2
APPLICATION NO. : 14/901995
DATED : June 26, 2018
INVENTOR(S) : Qin Liu et al.

Page 1 of 1

It is certified that error appears in the above-identified patent and that said Letters Patent is hereby corrected as shown below:

In the Claims

In Column 24, Line 65, in Claim 20, delete "trialkyamines," and insert -- trialkylamines, --, therefor.

In Column 25, Line 4, in Claim 20, delete "group)," and insert -- group, --, therefor.

Signed and Sealed this
First Day of January, 2019

Andrei Iancu
*Director of the United States Patent and Trademark Office*